United States Patent [19]

Ohsawa et al.

[11] Patent Number: 5,225,013

[45] Date of Patent: Jul. 6, 1993

[54] PNEUMATIC RADIAL TIRE INCLUDING WAVY OR ZIGZAG BELT CORDS

[75] Inventors: Yasuo Ohsawa; Yoshihide Kohno; Hiroyuki Koseki, all of Kodaira, Japan

[73] Assignee: Bridgestone Corporation, Tokyo, Japan

[21] Appl. No.: 493,448

[22] Filed: Mar. 14, 1990

Related U.S. Application Data

[63] Continuation-in-part of Ser. No. 490,292, Mar. 8, 1990, abandoned.

[30] Foreign Application Priority Data

Mar. 14, 1989 [JP] Japan .................... 1-61912

[51] Int. Cl.[5] ............... B60C 9/18; B60C 9/20
[52] U.S. Cl. .................... 152/527; 152/526; 152/531
[58] Field of Search .......... 57/212, 237, 902; 152/451, 527, 556, 526, 531

[56] References Cited

U.S. PATENT DOCUMENTS

| | | | |
|---|---|---|---|
| 3,757,843 | 9/1973 | Carr | 152/527 |
| 3,802,982 | 4/1974 | Alderfer | 152/527 |
| 4,235,274 | 11/1980 | Suzuki et al. | |
| 4,749,017 | 6/1988 | Loesch | 152/527 |
| 4,895,200 | 1/1990 | Terrill et al. | 152/451 |
| 5,004,031 | 4/1991 | Kadota et al. | 152/531 X |
| 5,054,532 | 10/1991 | Kohno et al. | 152/527 |

FOREIGN PATENT DOCUMENTS 0158436 10/1985 European Pat. Off.
3108140 9/1982 Fed. Rep. of Germany.
2501126 9/1982 France ................. 152/527
815055 6/1959 United Kingdom.

*Primary Examiner*—Michael W. Ball
*Assistant Examiner*—Adrienne C. Johnstone
*Attorney, Agent, or Firm*—Oliff & Berridge

[57] ABSTRACT

A pneumatic radial tire including a carcass layer having cords embedded therein and arranged perpendicular to an equatorial plane of the tire, and a belt layer including at least one belt ply having a large number of cords embedded therein, the cords including one or more filaments. The cords are disposed radially outside of said carcass layer, arranged substantially in parallel to the equatorial plane of the tire and bent in a wavy or zigzag form. At least those of the cords or filaments located at widthwise outermost locations in the parallel belt ply satisfy the following expression:

$$d \times a/\lambda^2 \leq 0.005$$

and the cords or filaments in the parallel belt ply satisfy the following expression:

$$a/\lambda \leq 0.1$$

wherein $d$ is a filament diameter of the cords or filaments; $\lambda$ is a wavelength of the form; and $a$ is one half of the amplitude of the form. Further, cords inclined at an angle of 10 to 50 degrees with respect to the equatorial plane of the tire are embedded in an inclined belt ply provided radially outside the carcass layer, thereby increasing the internal shearing rigidity of the belt layer and increasing the cornering power.

5 Claims, 6 Drawing Sheets

PNEUMATIC RADIAL TIRE INCLUDING WAVY OR ZIGZAG BELT CORDS

This application is a continuation-in-part application of U.S. Ser. No. 07/490,292, filed Mar. 8, 1990, now abandoned.

BACKGROUND OF THE INVENTION

1. Field of the Invention

The present invention relates to a pneumatic radial tire.

2. Description of the Related Art

Pneumatic radial tires such as that described in GB Patent No. 815,055 are conventionally well known. The tire described in this patent comprises a carcass layer consisting of at least one carcass ply having a plurality of cords embedded therein and substantially perpendicular to an equatorial plane of the tire, and a belt layer disposed radially outside the carcass layer and including at least one belt ply which has a large number of cords bent in a wavy or zigzag form and which are arranged substantially in parallel to the equatorial plane of the tire.

In such a pneumatic radial tire, however, if it has run for a long period of time in a loaded condition, the cords in the belt ply, particularly the cords in the vicinity of widthwise opposite edges of the tire may be broken due to fatigue. The reason is that circumferential stretching and compressive strains may be repeatedly produced in the belt ply of the pneumatic tire by deformation due to contacting the ground during running, and such strains similarly act even on the cords embedded in the belt ply. Because the cords embedded in the belt ply are arranged substantially in parallel to the equatorial plane of the tire and bent in a wavy or zigzag form, if they are stretched and compressed circumferentially as described above, a bending moment may be produced in the bends of the filaments constituting the cord so as to develop a surface strain in the surfaces of the bends of the filaments. The smaller the radius of curvature of the bends and the larger the value of the above-described circumferential strain, the larger the value of the surface strain becomes. If this value exceeds an acceptable limit, the filaments may be broken at the bends due to fatigue. When the tire is running in a loaded condition, the circumferential strain is larger in a portion closer to the widthwise opposite edges of the belt ply and hence, the maximum surface strain may be produced at the bends of the cords at opposite edges of the belt ply, so that the cords in this portion may be broken first due to fatigue.

In addition, such a pneumatic radial tire has lower cornering power and lower steering stability when cornering. The reason is as follows: It is known that the cornering power Cp is generally proportional to the value of the Gough rigidity of the tire as represented by the following expression:

$$\frac{1}{A/EI + B/G}$$

wherein G is an internal shearing rigidity; and each of A and B is a constant. However, since the belt ply has a smaller rigidity because of its smaller circumferential bending rigidity, i.e., its smaller value of EI, a smaller value of the cornering power Cp results.

SUMMARY OF THE INVENTION

To solve such a problem, the inventors have made studies of the surface strain of cords or filaments bent in a wavy or zigzag form and have consequently found that the maximum value of the surface strain is proportional to the value of the following expression:

$$d \times a/\lambda^2$$

wherein d is a diameter of each of the filaments; a is one half of the amplitude of the wavy or zigzag form; and $\lambda$ is a wavelength of the wavy or zigzag form, and if the value of the above expression is less than a certain value, the cords or filaments cannot be broken. Further it has been found that the circumferential rigidity of the belt ply is related to the value of $a/\lambda$, and if the value of $a/\lambda$ is less than a certain value, the deterioration in cornering power Cp can be minimized.

It is an object of the present invention to provide a way of easily preventing the breaking of the cords or filaments at opposite edges of a ply due to its surface strain, and of improving the cornering power.

To achieve the above objects, according to the present invention, there is provided a pneumatic radial tire which has:

a carcass layer consisting of at least one carcass ply having a large number of first cords embedded therein and disposed substantially perpendicular to an equatorial plane of the tire;

a belt layer including at least one belt ply having a large number of second cords embedded therein, each of the second cords comprising at least one filament, the second cords being disposed radially outside of said carcass layer, arranged substantially in parallel to the equatorial plane of the tire and bent in a wavy form or a zigzag form, at least those of the second cords located at widthwise outermost positions in the parallel belt ply satisfying the following expression:

$$d \times a/\lambda^2 \leq 0.005$$

and the second cords in the parallel belt ply satisfying the following expression:

$$a/80 \leq 0.1$$

wherein d is a diameter of the filament or filaments; $\lambda$ is a wavelength of the form; and a is one half of the amplitude of the form, the belt layer further including at least one inclined belt ply having a large number of third cords which are embedded therein and inclined at an angle in a range of 10 to 50 degrees with respect to the equatorial plane of the tire.

When the loaded tire is running, the parallel belt ply and the second cords embedded in the parallel belt ply are repeatedly subjected to circumferential tensile and compressive strains. Because the first cords are arranged substantially in parallel to the equatorial plane of the tire and bent in a wavy or zigzag form, a surface strain is produced in surfaces of bends of the second cords. The smaller the radius of curvature of the bends, the larger the surface strain becomes, and the closer to the widthwise opposite outer edges of the parallel belt ply, the larger the surface strain becomes. In order to overcome this problem, the pneumatic radial tire according to the present invention is provided with the second cords embedded in the parallel belt ply, at least those of the second cords located at widthwise outermost positions in the parallel belt ply, i.e., at least those in which the maximum surface strain is produced, satisfying the following expression:

$$d \times a/\lambda^2 \leq 0.005$$

wherein d is a diameter of the filament constituting the second cord; λ is a wavelength of the form; and one is a half of the amplitude of the form. As a result, such second cords satisfying the above expression cannot be broken at their bends due to fatigue. The second cord may be formed from a plurality of filaments twisted together or from a single filament. The cornering power Cp is proportional to the value of Gough rigidity as described above, but if the value a/λ is 0.1 or less, the second cords are nearly in a straight line and have a larger value of circumferential bending rigidity EI, thereby providing an improved cornering power. In addition, according to the present invention, the belt layer is provided with at least one inclined belt ply having a large number of third cords embedded therein and inclined at an angle in a range of 10 to 50 degrees with respect to the equatorial plane of the tire and hence, the value of internal shearing rigidity of the belt layer is increased and a further improvement in cornering power can be obtained.

Further, according to the present invention, the second cord satisfying the above expressions may be disposed in regions extending ¼ of the width of the belt ply from the widthwise opposite outer edges of the belt ply. Consequently, it is possible to reliably prevent the breaking of the second cords.

The failure of the cords in the belt layer progresses gradually from the second cords provided at the widthwise edge of the tire to the second cords provided near the equatorial plane of the tire. However the failure does not reach the equatorial plane and stops at the second cord located halfway between the outer widthwise edge and the equatorial plane. Therefore, the second cord which satisfies the previous equation is used in the above stated range.

The above and other objects, features and advantages of the invention will become apparent from a reading of the following detailed description of the preferred embodiments, taken in conjunction with the accompanying drawings.

DESCRIPTION OF THE PREFERRED EMBODIMENTS

The present invention will now be described by way of one embodiment with reference to the accompanying drawings.

Figure 1:
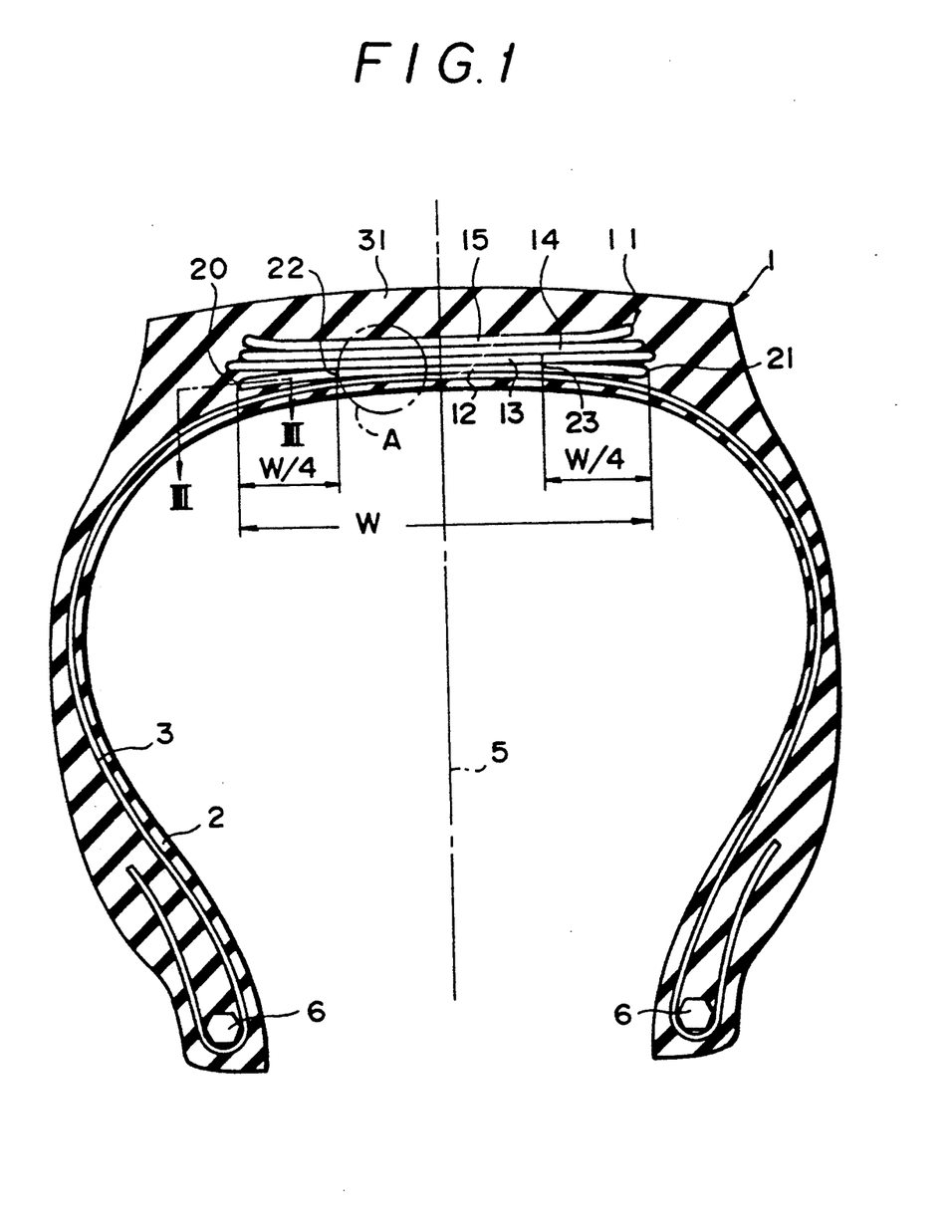
FIG. 1 is a radial sectional view of a pneumatic radial tire according to one embodiment of the present invention.
Figure 2:
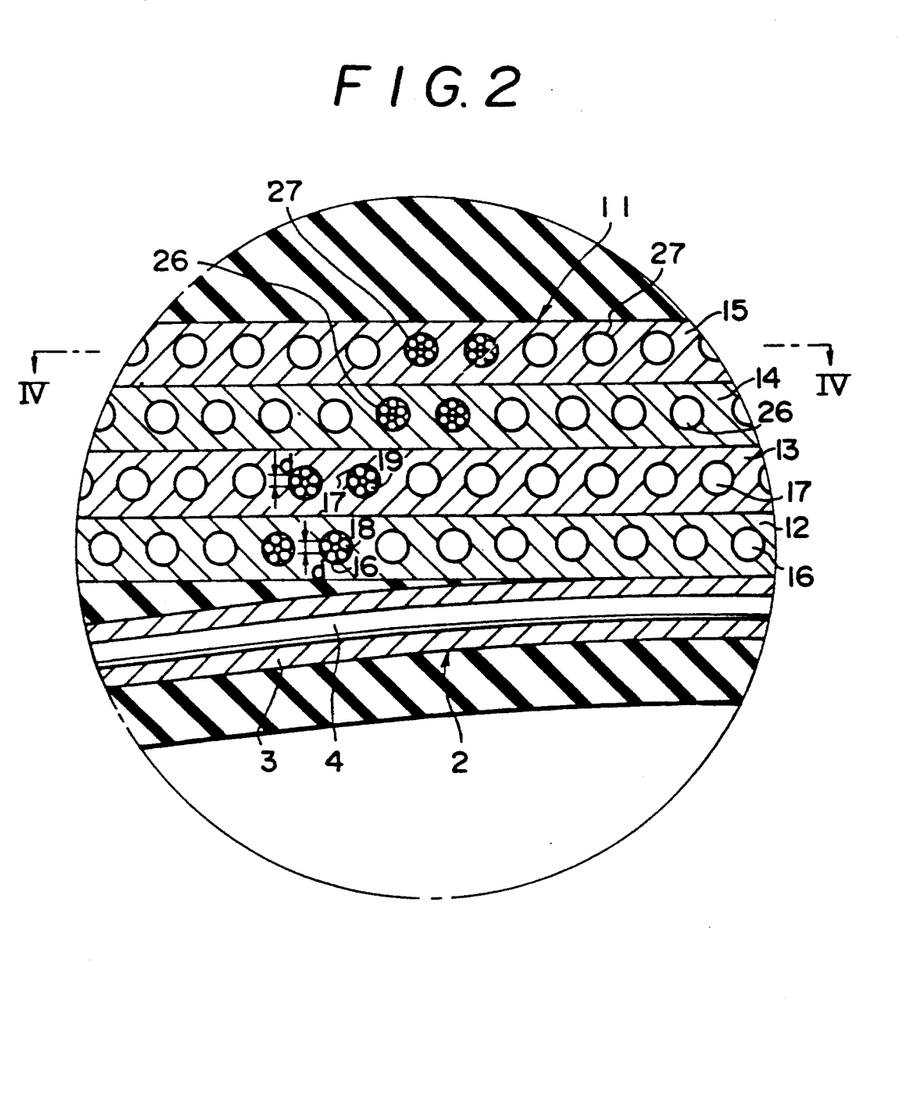
FIG. 2 is an enlarged sectional view of a portion surrounded by a circle A shown in FIG. 1.

FIGS. 1 and 2 show one embodiment of a pneumatic radial tire 1 which includes a toroidal carcass layer 2 comprised of at least one (e.g., one in the illustrated embodiment) carcass ply 3. A large number of cords 4 made of steel or the like are embedded in the carcass ply 3 and extend in a plane substantially perpendicular to an equatorial plane 5 of the tire, i.e., in a radial plane. A belt layer 11 is disposed radially outside carcass layer 2 and includes at least one (e.g., two in the illustrated embodiment) parallel belt plies 12 and 13, and at least one (e.g., two in the illustrated embodiment) inclined belt plies 14 and 15. The parallel belt plies 12 and 13 are disposed toward the inside of the tire 1, relative to the inclined belt plies 14 and 15.

Figure 3:
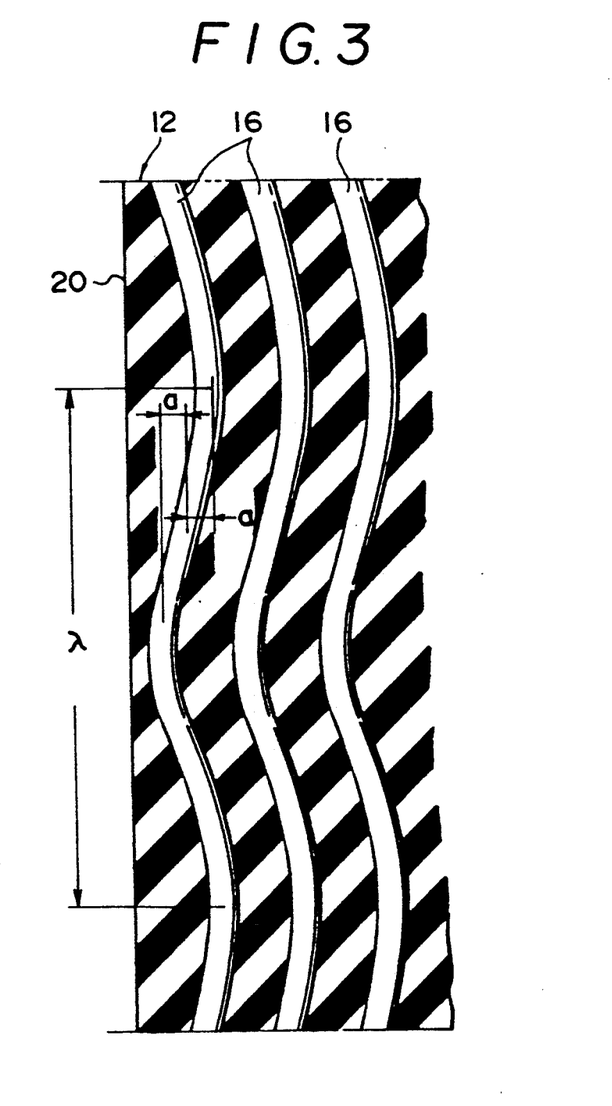
FIG. 3 is a sectional view of layer 12 of FIG. 2 taken along line III—III in FIG. 1.

A large number of cords 16, 17 made of steel are embedded in each of the parallel belt plies 12 and 13 and are arranged substantially in parallel to the equatorial plane 5 of the tire, i.e., substantially circumferentially. The cords 16 and 17 are bent in a wavy or zigzag form, e.g., in a square wave, triangular wave or sine wave form in respective planes parallel to the outer and inner surfaces of the parallel belt plies 12, 13 as shown in FIG. 3 and are disposed in the same phase. The cords 16 and 17 may be formed of a plurality of (e.g., five) filaments 18 and 19 twisted together as shown in FIG. 2, or may be formed of a single filament (monofilament). Here, at least those of the cords 16 and 17 which are located in the parallel belt plies 12 and 13 at their widthwise outermost positions are a cord satisfying the following expression:

$$d \times a/\lambda^2 \leq 0.005$$

wherein d represents the diameter of the filament 18, 19; λ represents the wave length of the wavy or zigzag cord 16, 17; and a denotes one half of the amplitude of the wavy or zigzag cord 16, 17. In FIG. 3, a is ½ of the distance between the center of the cord at the peaks and valleys of the cord.

Figure 6:
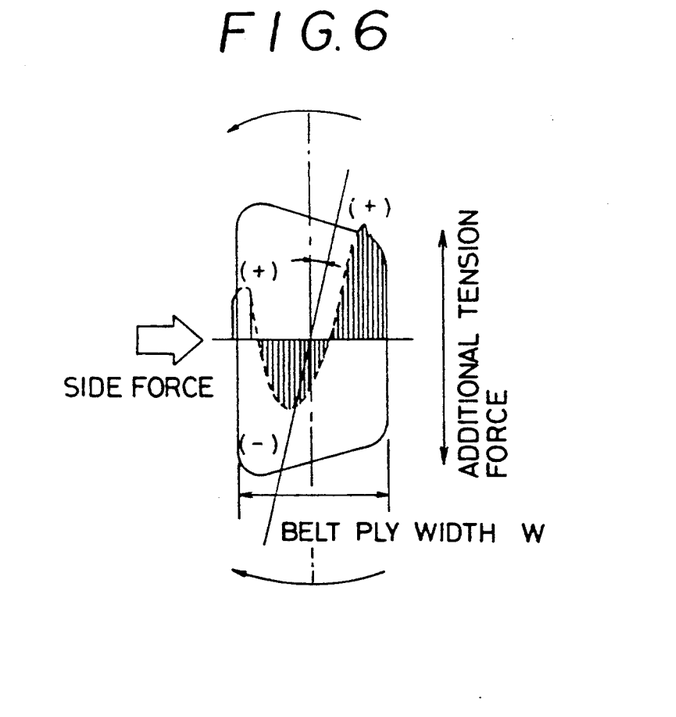
FIG. 6 is a view of tire foot print showing additional tension force in relation to belt ply width.
Figure 7:
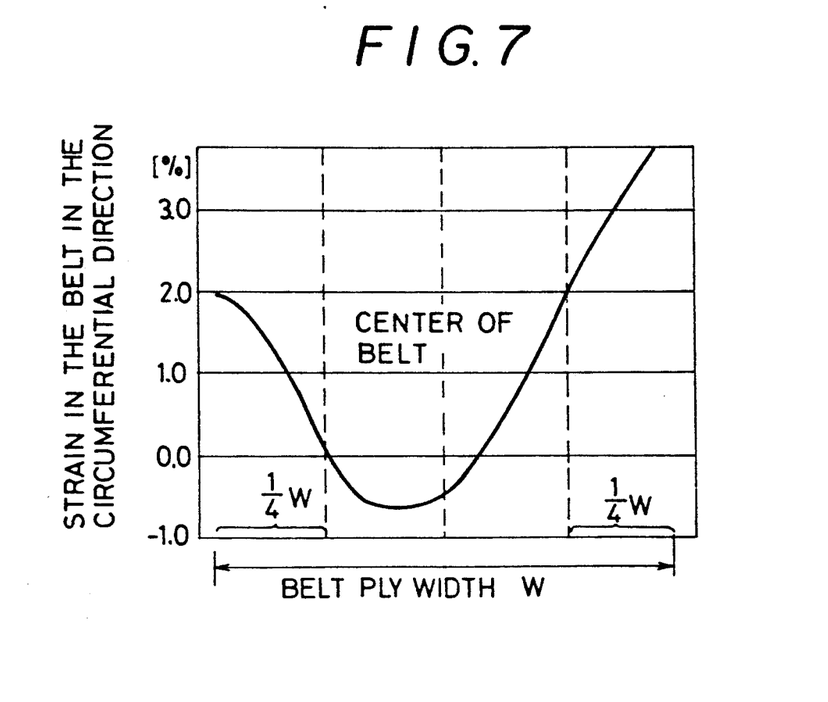
FIG. 7 is a graph showing the relationship between the belt ply width and the strain in the belt in the circumferential direction for the case shown in FIG. 6.

It is preferable that such a cord is used for the cord disposed between widthwise opposite outer ends 20, 21 of the parallel belt ply 12, 13 and locations 22, 23 spaced apart from such opposite outer ends 20, 21 by a width W/4 where W is the width of the parallel belt ply 12, 13. This point will be explained with reference to FIGS. 6 and 7. In FIG. 6 a tire foot print is illustrated in a plan view showing the relation between the additional tension force in the filaments making up the belt, and the belt ply width W. In FIG. 7 is shown the relation between the strain in the circumferential direction, of the filaments making up the belt, and the belt ply width W. In this case the tire size was 175/70 SR13, the contact load 270 kg., the surface contact pressure 1.7 kg/cm² and the side force 110 kg.

As is clear from FIG. 7, the strain in the belt ply filaments is a maximum in the edge portions located within ¼ the belt width from the edge of the belt, while further inside of this region, the greatest strain is less than half of the maximum strain. Alternatively, for the cords 16 and 17 between such regions, a cord as described above need not be used, because no large circumferential strain is produced in the parallel belt plies 12 and 13 between the locations 22 and 23, even if the tire is running while being subjected to a load.

In addition, the cords 16 and 17 embedded in the parallel belt plies 12 and 13 are ones satisfying the following expression:

$$a/\lambda \leq 0.1$$

Figure 4:
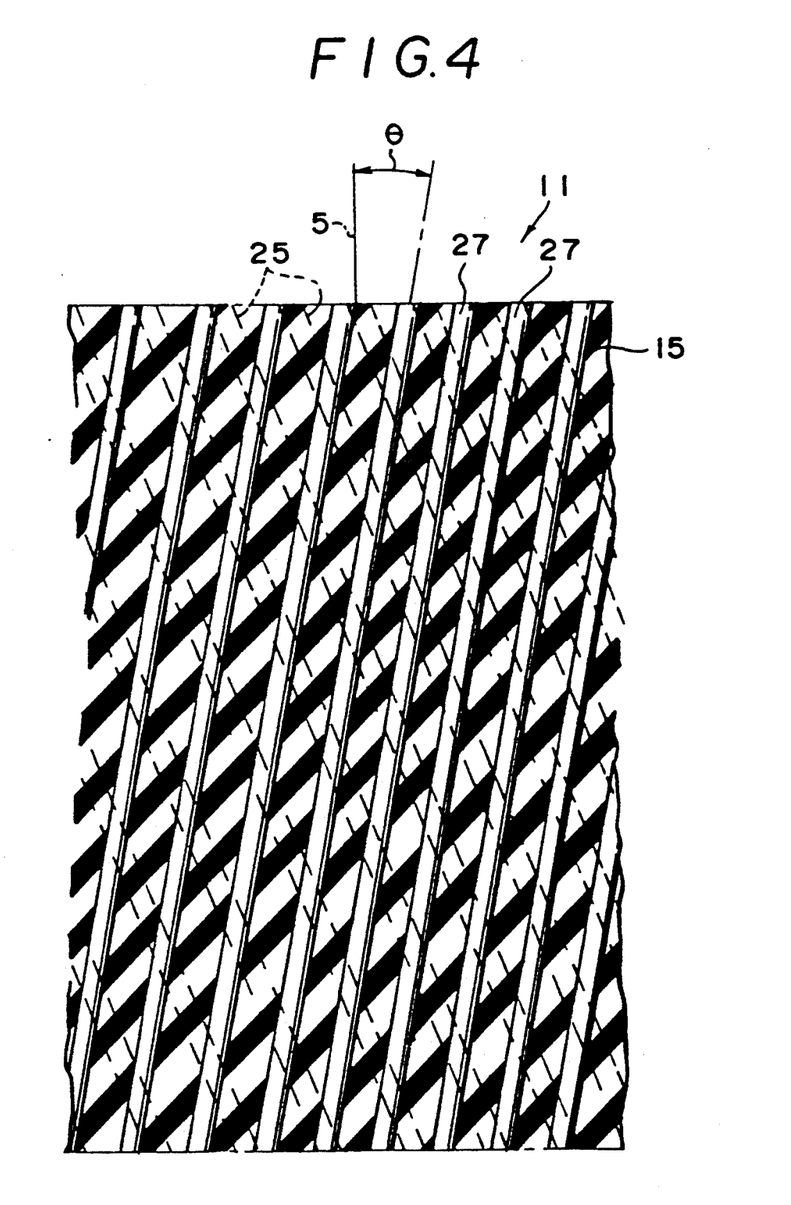
FIG. 4 is a sectional view taken along line IV—IV in FIG. 2.

On the other hand, a large number of cords 26 and 27 made of steel or organic fiber are embedded in the inclined belt plies 14 and 15, and as shown in FIG. 4, the directions of inclination of the cords 26 and 27 are opposite from each other with respect to the equatorial plane of the tire and thus cross over each other with the equatorial plane of the tire being interposed therebetween. The cords 26 and 27 are inclined at an angle in a range of 10 to 50 degrees with respect to the equatorial plane 5 of the tire. A tread is disposed radially outside the belt layer 11.

The operation of this embodiment will be described below.

With the tire 1 loaded and running, circumferential stretching and compressive strains act on the parallel belt plies 12 and 13 and on the inclined belt plies 14 and 15 due to the ground contact deformation of the tire 1. A surface strain is developed in the filaments 18 and 19 of the cords 16 and 17 at their bends, because the cords 16 and 17, embedded in the parallel belt plies 12 and 13, are arranged substantially in parallel to the equatorial plane 5 of the tire and bent in a wavy or zigzag form. Here, the smaller the radius of curvature of the bends the larger the circumferential strains become and further, the closer to the widthwise opposite outer edges of the parallel belt plies 12 and 13, the larger the value of the surface strain becomes. For this reason, in this embodiment, a cord satisfying the following expression:

$$d \times a/\lambda^2 \leq 0.005$$

is used for at least those cords located at the widthwise outermost positions in the parallel belt plies 12 and 13, i.e., for at least those in which the maximum surface strain is produced. Consequently, the filament of the cord satisfying the above expression will not be broken at its bends, leading to improved safety.

If turning is conducted during running of the tire 1 as described above, a lateral force acts on the tire 1. At this time, a large cornering power Cp is required to be generated. Such a cornering power is proportional to the value of the Gough rigidity of the tire 1 as represented in the following expression and hence, the larger the value of the Gough rigidity, the more satisfactory the steerability.

$$C_p = \frac{1}{A/EI + B/G}$$

wherein EI is a circumferential bending rigidity; G is an internal shearing rigidity; and each of A and B each is a constant. In addition, a cord satisfying the following expression:

$$a/\lambda \leq 0.1$$

may be used for the cords 16 and 17 in the parallel belt plies 12 and 13. Consequently, the cords 16 and 17 are nearly straight lines and have an increased value of the circumferential bending rigidity EI, leading to an improved cornering power Cp to provide a good steering stability.

Further, in this embodiment, the belt layer 11 is formed by combination of the parallel belt plies 12 and 13 with the inclined belt plies 14 and 15 inclined at an angle of 10 to 50 degrees with respect to the equatorial plane 5 of the tire. This is because the value of the internal shearing rigidity G is smaller and the cornering power Cp is reduced if only the parallel belt plies 12 and 13 are provided, since the cords 16 and 17 in the parallel belt plies 12 and 14 are arranged substantially in parallel to the equatorial plane 5 of the tire, but such a reduction of the cornering power Cp is made up for by the inclined belts 14 and 15 having a larger internal shearing rigidity G.

Figure 5:
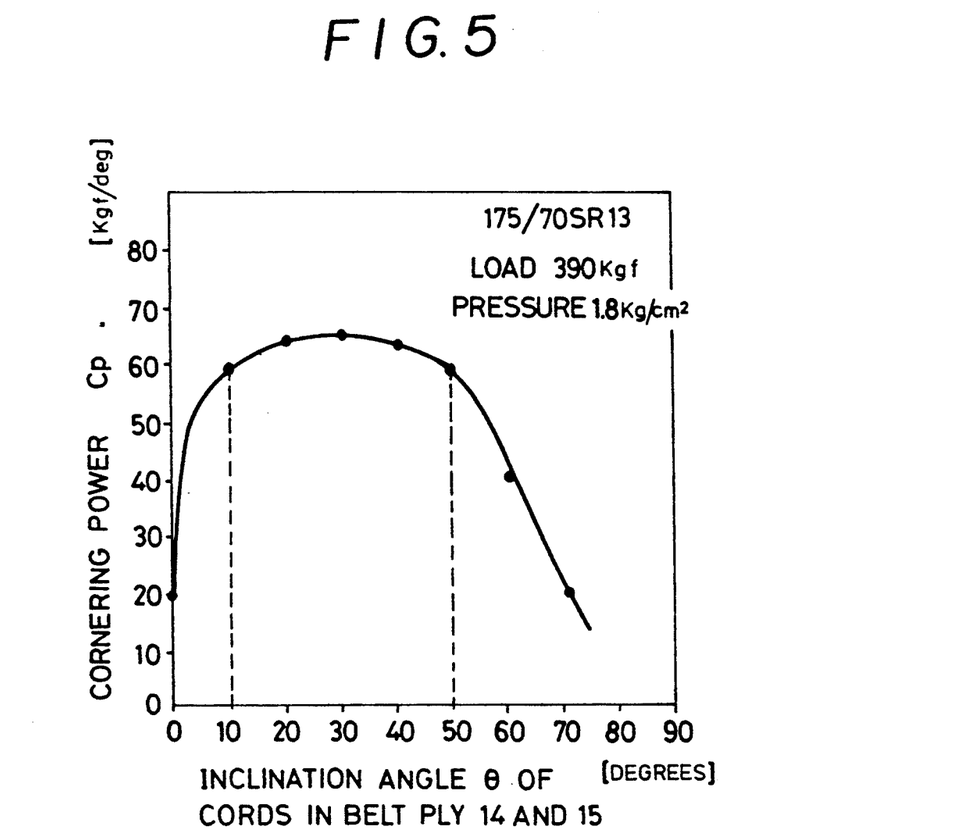
FIG. 5 is a graph showing the relation between the inclination angle of the cords and the cornering power.

FIG. 5 shows the relation between the cornering power Cp and the inclination angle of the cords 26, 27 in the belt plies 14, 15 to the equatorial plane of the tire. As can be seen in FIG. 5, the cornering power Cp is a maximum when the inclination angle $\theta$ of the cords 26, 27 is within the range from 10 degrees to 50 degrees. This is because, if the inclination angle $\theta$ is less than 10 degrees and approaches zero, the shear rigidity of the belt plies 14, 15 is lowered, while if the inclination angle is greater than 50 degrees, the tire circumferential rigidity and shear rigidity are both reduced.

A first test will be described hereinbelow. In this test, there were prepared a conventional tire 1, comparative tires 1, 2 and 3 having a value of the above expression exceeding 0.005, and tires 1, 2 and 3 according to the present invention, having specifications as given in Table 1. In Table 1, first, second, third and fourth belt plies 1, 2, 3 and 4 are numbered in sequence from an innermost ply side in the belt layer. In the present invention tires 1 and 2, the first and second belt plies correspond to the parallel belt plies, while the third and fourth belt plies correspond to the inclined belt plies 14 and 15. In addition, in Table 1, the + (positive) value of the angle of the cord type means a rightward ascending inclination, while the − (negative) value of the angle means a leftward ascending inclination as shown in FIG. 4. In addition 1×5×0.40 means that five filaments having diameter d of 0.40 mm are twisted together to form a cord; +1×5×0.60 means that five filaments having a diameter d of 0.60 mm are twisted together to form a cord; and 2+6×0.30 means that two filaments having a diameter of 0.30 mm are bundled to make a core wire which is then covered with six filaments having a diameter of 0.30 to form a cord. In this case, the size of each tire was of 11/70R22.5. Each tire was filled to a normal internal pressure of 7.25 kg/cm², and then the tire was urged against a drum and run 1000 km at a speed of 60 km/hr while being subjected to a normal load of 2500 kg and a lateral load of 50% of the normal load, thus conducting a turning test. After completion of the test, the number of cords broken was counted. In addition, the cornering power Cp produced in each tire at this time was measured. Results are given in Table 2. With the comparative tires, one or more cord(s) was broken in all cases, but with the present tires, not any of the cords were broken. With the present tire 3 because it is different from the other present tires and does not have inclined cords but only has wavy shaped cords, the cornering power Cp is considerably lowered, but with the present tires 1 and 2, the cornering power Cp is improved as compared to the conventional tire 1. Herein, the cornering power Cp is represented by an index based on the measured value of the conventional tire 1 of 100. The larger the index value, the larger the cornering power Cp is, and when the index is 100, the cornering power Cp is 280 kgf/deg.

Since in the tire 3 all the belt plies 12, 13, 14 and 15 are wavy shaped cords, the internal shearing rigidity is small, the cornering power is also small.

A second test will be described hereinbelow. In this test, there were prepared conventional tires 2, comparative tires 4, 5 and 6 having a value of the above expression exceeding 0.005, and present invention tires 4, 5 and 6 according to the present invention, having specifications as given in Table 3. In Table 3, $1 \times 4 \times 0.23$ in the column of the cord type means that four filaments having a diameter d of 0.23 mm are twisted together to form a cord; 0.5 or 0.6 single wire means that a cord is formed from a single filament having a diameter d of 0.5 mm or 0.6 mm.

The size of each tire was of 175/70SR13. Each tire was filled to a normal internal pressure of 1.9 kg/cm$^2$ and then, the tire was subjected to running for 50,000 km on a drum at a speed of 80 km/hr., while under an applied load of 780 kg (two times a normal load 390 kg), thus effecting the large load test.

After completion of the test, the number of cords broken was counted. Results are given in Table 4. With the comparative tires, one or more cord(s) was broken in all cases, but with the present tires, not any of the cords were broken. In addition, a turning test was conducted by filling each tire to the same normal internal pressure as described above and then urging the tire against a drum to run the tire 1,000 km at a speed of 80 km/hr., while applying the same normal load as described above and lateral load of 50% of the normal load to the tire. After completion of the test, the number of the cords broken was counted. Additionally, the concerning power Cp produced in each tire at this time was measured. Results of this test are given in Table 4. As apparent from Table 4, with the comparative tires, one or more cord(s) was broken in all cases, but with the present tires, not any of the cords were broken. With the present tire 6, the cornering power is considerably lowered, but with the present tires 4 and 5, the cornering power is slightly improved as compared to the conventional tire 2. Herein, the cornering power Cp is represented by an index based on the measured value of the conventional tire 2 of 100. The larger the index value, the larger the cornering power Cp is, and when the index is 100, the cornering power Cp is 68 kgf/deg.

A description will now be made of a third test. In this test, there were prepared the conventional tire 3, comparative tires 7 and 8 having a value of a/λ exceeding 0.1, and present tires 7 and 8 according to the present invention. The size of each tire was of 175/70SR13, and the value of $d \times a/\lambda^2$ was standardized to 0.0025. Each tire was filled to an internal pressure of 1.9 kg/cm$^2$, and the tire was urged against a drum to run at a speed of 80 km while being subjected to a normal load of 390 kg and a lateral load of 50% of the normal load. The cornering power Cp produced in each tire at this time was measured. Results are given in Table 5. As apparent from Table 5, with the comparative tires, the cornering power was lower than the conventional tire 3 so that these tires cannot be used except for special applications, e.g., for vehicles which travel in a straight line. In contrast, with the present invention tires, the values of the cornering power Cp are substantially the same as those of the conventional tire 3 and hence, these tires are suitable for use as tires running on a usual road. Herein, the cornering power Cp is represented by an index based on the measured value of the conventional tire 3 to 100. The larger the index value, the larger the cornering power Cp is, and when the index is 100, the cornering power Cp is 68 kgf/deg.

Although the cornering power Cp of the present tire 7 is 8% lower than that of the conventional tire, generally a tire with a Cp value as much as 10% lower will still give adequate performance. Moreover, in order to maintain a cornering power Cp at the same level as that of the conventional tire, such as with the present tire 9, a/λ can be made less than 0.06. In this case if the value of a/λ in the present invention is less than 0.06 then this is said to give a desirable range.

TABLE 1

|  | First B.P. Cord type | Second B.P. Cord type | Third B.P. Cord type | Fourth B.P. Cord type | S.A. a (mm) | W.L. λ (mm) | $d \times a / \lambda^2$ | $a/\lambda$ |
|---|---|---|---|---|---|---|---|---|
| Conv. tire 1 | +67°<br>1 × 5 × 0.40 | −18°<br>1 × 5 × 0.40 | +18°<br>1 × 5 × 0.40 | +18°<br>1 × 5 × 0.40 | — | — | — | — |
| Com. tire 1 | 0° wavy<br>1 × 5 × 0.60 | 0° wavy<br>1 × 5 × 0.60 | +25°<br>2 + 6 × 0.30 | −25°<br>2 + 6 × 0.30 | 0.5 | 5.8 | 0.009 | 0.086 |
| Com. tire 2 | 0° wavy<br>1 × 5 × 0.60 | 0° wavy<br>1 × 5 × 0.60 | +25°<br>2 + 6 × 0.30 | −25°<br>2 + 6 × 0.30 | 0.5 | 6.1 | 0.008 | 0.082 |
| Com. tire 3 | 0° wavy<br>1 × 5 × 0.60 | 0° wavy<br>1 × 5 × 0.60 | +25°<br>2 + 6 × 0.30 | −25°<br>2 + 6 × 0.30 | 0.5 | 7.1 | 0.006 | 0.070 |
| Pre. tire 1 | 0° wavy<br>1 × 5 × 0.60 | 0° wavy<br>1 × 5 × 0.60 | +25°<br>2 + 6 × 0.30 | −25°<br>2 + 6 × 0.30 | 0.5 | 7.7 | 0.005 | 0.065 |
| Pre. tire 2 | 0° wavy<br>1 × 5 × 0.60 | 0° wavy<br>1 × 5 × 0.60 | +25°<br>2 + 6 × 0.30 | −25°<br>2 + 6 × 0.30 | 0.5 | 8.7 | 0.004 | 0.057 |
| Pre. tire 3 | 0° wavy<br>1 × 5 × 0.60 | 0° wavy<br>1 × 5 × 0.60 | 0° wavy<br>1 × 5 × 0.60 | 0° wavy<br>1 × 5 × 0.60 | 0.5 | 7.7 | 0.005 | 0.065 |

B.P. = belt ply
S.A. = simple amplitude
W.L. = wavelength
Conv. = Conventional
Com. = Comparative
Pre. = present invention

TABLE 2

|  | Turning test Number of cords broken | Cornering power Cp |
|---|---|---|
| Conv. tire 1 | — | 100 |
| Com. tire 1 | 8 | 102 |
| Com. tire 2 | 10 | 103 |
| Com. tire 3 | 1 | 105 |
| Pre. tire 1 | 0 | 110 |
| Pre. tire 2 | 0 | 108 |
| Pre. tire 3 | 0 | 31 |

TABLE 4

| | Number of cords broken | | |
|---|---|---|---|
| | High load test | turning test | Cornering power |
| Conv. tire 2 | — | — | 100 |
| Com. tire 4 | 6 | 16 | 96 |
| Com. tire 5 | 4 | 8 | 98 |
| Com. tire 6 | 1 | 2 | 101 |
| Pre. tire 4 | 0 | 0 | 101 |
| Pre. tire 5 | 0 | 0 | 103 |
| Pre. tire 6 | 0 | 0 | 32 |

Conv. = conventional
Com. = comparative
Pre. = present invention

TABLE 3

| | First B.P. Cord type | Second B.P. Cord type | S.A. a (mm) | W.L. (mm) | $d \times a / \lambda^2$ | $a/\lambda$ |
|---|---|---|---|---|---|---|
| Conventional tire 2 | +18° 1 × 5 × 0.40 | −18° 1 × 5 × 0.40 | — | — | — | — |
| Comparative tire 4 | +30° 1 × 4 × 0.23 | 0° wavy 0.6 s.w. | 0.5 | 5.8 | 0.009 | 0.086 |
| Comparative tire 5 | +30° 1 × 4 × 0.23 | 0° wavy 0.6 s.w. | 0.5 | 6.1 | 0.008 | 0.082 |
| Comparative tire 6 | +30° 1 × 4 × 0.23 | 0° wavy 0.6 s.w. | 0.5 | 7.1 | 0.006 | 0.070 |
| Present tire 4 | +30° 1 × 4 × 0.23 | 0° wavy 0.6 s.w. | 0.5 | 7.7 | 0.005 | 0.065 |
| Present tire 5 | +30° 1 × 4 × 0.23 | 0° wavy 0.6 s.w. | 0.5 | 8.7 | 0.004 | 0.057 |
| Present tire 6 | 0° wavy 0.5 s.w. | 0° wavy 0.5 s.w. | 1.0 | 10.0 | 0.005 | 0.1 |

B.P. = belt ply
S.A. = single amplitude
W.L. = wavelength
s.w. = single wire

TABLE 5

| | First B.P. Cord type | Second B.P. Cord type | S.A. a (mm) | W.L. λ (mm) | $a/\lambda$ | Cornering power Cp |
|---|---|---|---|---|---|---|
| Conventional tire 3 | +18° 1 × 4 × 0.23 | −18° 1 × 4 × 0.23 | — | — | — | 100 |
| Comparative tire 7 | +25° 1 × 4 × 0.23 | 0° wavy 0.6 s.w. | 2.87 | 26.1 | 0.11 | 85 |
| Comparative tire 8 | +25° 1 × 4 × 0.23 | 0° wavy 0.6 s.w. | 5.29 | 35.3 | 0.15 | 68 |
| Present tire 7 | +25° 1 × 4 × 0.23 | 0° wavy 0.6 s.w. | 2.40 | 24.0 | 0.10 | 92 |
| Present tire 8 | +25° 1 × 4 × 0.23 | 0° wavy 0.6 s.w. | 0.38 | 9.6 | 0.04 | 102 |
| Present tire 9 | 1 × 4 × 0.23 | 0.6 s.w. | 0.87 | 14.4 | 0.06 | 100 |

B.P. = belt ply
S.A. = single amplitude
W.L. = wavelength
s.w. = single wire

What is claimed is:

1. A pneumatic radial tire comprising:
    (a) a carcass layer having at least one carcass ply having a large number of first cords embedded therein and substantially perpendicular to an equatorial plane of the tire;
    (b) a belt layer including at least one belt ply, each said belt ply having a large number of second cords embedded therein, said second cords comprising a monofilament and being disposed radially outside of said carccas layer relative to the inside of the tire, each of said second cords being arranged substantially parallel to the equatorial plane of the tire and bent in a wavy form or a zigzag form substantially parallel with the inner and outer surfaces of the belt ply in which said each second cord is embedded, at least those of said second cords located at widthwise outermost positions in the parallel belt ply satisfying the following expression:

$$d \times a / \lambda^2 \leq 0.005$$

and said second cords satisfying the following expression:

$$a/\lambda \leq 0.1$$

wherein d is a diameter of said filament; λ is a wavelength of the form; and a is one half of the amplitude of the form; and (c) at least one inclined belt ply provided in said belt layer and mounted radially outside said at least one belt ply having said second cords, said at least one belt ply having a larger number of third cords which are embedded therein and inclined at an angle in a range of 10 to 50 degrees with respect to the equatorial plane of the tire.

2. A pneumatic radial tire comprising:
    (a) a carcass layer having at least one carcass ply having a large number of first cords embedded therein and substantially perpendicular to an equatorial plane of the tire;
    (b) a belt layer including at least one belt ply, each said belt ply having a large number of second cords embedded therein, each of said second cords comprising at least one steel filament, said second cords being disposed radially outside of said carcass layer relative to the inside of the tire, each of said second cords being arranged substantially parallel to the equatorial plane of the tire and bent in a wavy form or a zigzag form substantially parallel with the inner and outer surfaces of the belt ply in which said each second cord is embedded at, least those of said second cords located at widthwise outermost positions in the parallel belt ply satisfying the following expression:

$$d \times a/\lambda^2 \leqq 0.005$$

and said second cords satisfying the following expression:

$$a/\lambda \leqq 0.1$$

wherein d is a diameter of said filament; $\lambda$ is a wavelength of the form; and a is one half of the amplitude of the form; and (c) at least one inclined belt ply provided in said belt layer and mounted radially outside said at least one belt ply having said second cords, said at least one inclined belt ply having a large number of third cords which are embedded therein and inclined at an angle in a range of 10 to 50 degrees with respect to the equatorial plane of the tire.

3. A pneumatic radial tire comprising:
(a) a carcass layer having at least one carcass ply having a large number of first cords embedded therein and substantially perpendicular to an equatorial plane of the tire;
(b) a belt layer including at least one belt ply, each said belt ply having a large number of second cords embedded therein, said second cords comprising a monofilament and being disposed radially outside of said carcass layer relative to the inside of the tire, each of said second cords being arranged substantially parallel to the equatorial plane of the tire and bent in a wavy form or a zigzag form substantially parallel with the inner and outer surfaces of the belt ply in which said each second cord is embedded, at least those of said second cords located at widthwise outermost positions in the parallel belt ply satisfying the following expression:

$$d \times a/\lambda^2 \leqq 0.005$$

and said second cords satisfying the following expression:

$$a/\lambda \leqq 0.1$$

wherein d is a diameter of said filament; $\lambda$ is a wavelength of the form; and a is one half of the amplitude of the form; and (c) at least two inclined belt plies provided in said belt layer having a large number of third cords which are embedded therein and inclined at an angle in a range of 10 to 50 degrees with respect to the equatorial plane of the tire, wherein the third cords of at least one of said at least two inclined belt plies are inclined in a first direction which differs from a second direction in which the third cords of at least another of the at least two inclined belt plies are inclined.

4. A pneumatic radial tire comprising:
(a) a carcass layer having at least one carcass ply having a large number of first cords embedded therein and substantially perpendicular to an equatorial plane of the tire;
(b) a belt layer including two belt plies, each belt ply having a large number of second cords embedded therein, said second cords comprising a monofilament and being disposed radially outside of said carcass layer relative to the inside of the tire, each of said second cords being arranged substantially parallel to the equatorial plane of the tire and bent in a wavy form or a zigzag form substantially parallel with the inner and outer surfaces of the belt plies in which said each second cord is embedded, at least those of said second cords located at widthwise outermost positions in the parallel belt plies satisfying the following expression:

$$d \times a/\lambda^2 \leqq 0.005$$

and said second cords satisfying the following expression:

$$a/\lambda \leqq 0.1$$

wherein d is a diameter of said filament; $\lambda$ is a wavelength of the form; and a is one half of the amplitude of the form; and (c) two inclined belt plies provided in said belt layer having a large number of third cords which are embedded therein and inclined at an angle in a range of 10 to 50 degrees with respect to the equatorial plane of the tire.

5. A pneumatic radial tire comprising:
(a) a carcass layer having at least one carcass ply having a large number of first cords embedded therein and substantially perpendicular to an equatorial plane of the tire;
(b) a belt layer including at least one belt ply, each said belt ply having a large number of second cords embedded therein, each of said second cords comprising a plurality of steel filaments twisted together, said second cords being disposed radially outside of said carcass layer relative to the inside of the tire, each of said second cords being arranged substantially parallel to the equatorial plane of the tire and bent in a wavy form or a zigzag form substantially parallel with the inner and outer surfaces of the belt ply in which said each second cord is embedded, at least those of said second cords located at widthwise outermost positions in the parallel belt ply satisfying the following expression:

$$d \times a/\lambda^2 \geqq 0.005$$

and said second cords satisfying the following expression:

$$a/\lambda \leqq 0.1$$

wherein d is a diameter of said filament; $\lambda$ is a wavelength of the form; and a is one half of the amplitude of the form; and (c) at least one inclined belt ply provided in said belt layer having a large number of third cords which are embedded therein and inclined at an angle in a range of 10 to 50 degrees with respect to the equatorial plane of the tire.

* * * * *